United States Patent Office 3,755,458
Patented Aug. 28, 1973

3,755,458
OXIDATION OF PROPYLENE AND ISOBUTENE TO UNSATURATED ALDEHYDES
Theodor Vrbaski, Harvey, Ill., and Thomas D. Sheehan, Kalamazoo, Mich., assignors to Atlantic Richfield Company, New York, N.Y.
No Drawing. Filed Sept. 10, 1968, Ser. No. 758,666
Int. Cl. C07c 45/02
U.S. Cl. 260—604 R          11 Claims

ABSTRACT OF THE DISCLOSURE

A process for the catalytic vapor phase oxidation of propylene and isobutene to unsaturated aldehydes, i.e. acrolein and methacrolein, respectively. The oxidation is conducted in the vapor phase at a temperature of about 350 to 550° C. with molecular oxygen-containing gas and in contact with an oxidation catalyst consisting essentially of oxides of copper, arsenic and from one to two members of Group VI having an atomic number of 42 to 74, i.e. molybdenum, tellurium and tungsten. The metals are present in the catalyst in the following atomic ratios:

$$Cu_aAs_bTe_cX_d$$

where X is molybdenum or tungsten, $a$ is about 2 to 30, $b$ is about 0.1 to 15, $c$ is 0 to about 5, and $d$ is about 2 to 30. Also, when $c$ is 0, X is molybdenum. Very high selectivity and total conversions are obtained.

---

This invention relates to the vapor phase catalytic oxidation of propylene to acrolein and of isobutene to methacrolein in the presence of a catalyst consisting essentially of oxides of arsenic, copper and molybdenum or oxides of arsenic, copper, tellurium and of molybdenum or tungsten.

The production of unsaturated aldehydes by vapor phase catalytic oxidation of olefins in the presence of specific catalysts is known, e.g., a mixture of oxides such as $Bi_2O_3$, $MoO_3$, $TeO_2$, $MnO_2$, $V_2O_5$, $B_2O_3$ etc., or a complex heteropolyacid salt in which molybdic acid is the metallic acid component. Various methods of operation have been proposed to oxidize normally gaseous hydrocarbons, but these methods have failed in many ways to adequately produce the desired results. These methods for oxidizing gaseous monoolefins to beta-gamma olefinically unsaturated aldehydes with the same number of carbon atoms as the hydrocarbon utilize catalysts that often convert only a portion of the reaction to the desired product, or they have a very short active life, or they are not sufficiently selective and generally the total conversion is not as high as desired.

The process of the present invention is a novel, vapor phase, catalytic oxidation of propylene and isobutylene to produce unsaturated aldehydes, i.e. acrolein and methacrolein, respectively, which avoids most of the problems associated with prior art processes. In accordance with the present invention, propylene or isobutylene is oxidized to acrolein or methacrolein respectively in the presence of molecular oxygen-containing gas, e.g. air, and an oxidation catalyst consisting essentially of oxides of copper, arsenic and of from one to two members of Group VI having an atomic number of 42 to 74, said metals being present in the catalyst in the following atomic ratios:

$$Cu_aAs_bTe_cX_d$$

where X is molybdenum or tungsten, $a$ is about 2 to 30, $b$ is about 0.1 to 15, $c$ is 0 to about 5, and $d$ is about 2 to 30, with the proviso that when $c$ is 0, X is molybdenum. When $c$ is other than 0, it is often at least about 0.2. The catalyst used in the method of this invention may conveniently also be represented by the following empirical formula:

$$Cu_aAs_bTe_cX_dO_e$$

where X, $a$, $b$, $c$, and $d$ are as specified above and $e$ designates that the metals are present as oxides and can preferably be, for instance, about 36 to 76 when the other elements are in their fully oxidized state. The amount of oxygen can be reduced correspondingly when the elements are in the lower valence state. Preferred catalysts are those in which $a$ is in the range from about 4 to 20, $b$ is in the range of about 3 to 8, $c$ in the range of about 0.5 to 2 and $d$ in the range from about 5 to 25. The catalyst can be carried on solid supports or be unsupported. Useful supports include, for example, essentially inert carriers such as silicon carbide, silica, alpha-alumina (e.g., corundum), graphite and the like, preferably having a surface area below about 25 square meters per gram.

It has been found that the complex oxidation catalyst of this invention which can be prepared by methods hereinafter described, is an effective catalyst for the described vapor phase oxidation reactions. This catalyst is reasonably stable, mechanically resistant to use, promotes high selectivity, and promotes a uniform oxidation reaction throughout the catalyst bed without developing hot spots therein. Illustrative of the complex oxidation catalysts used in the present invention are catalyst containing oxides of arsenic, tellurium, copper, and molybdenum with an atomic ratio of Mo:Cu:As:Te of about 25:8:4:1; and of about 25:20:8:1; oxides of tellurium, arsenic, copper, and tungsten with an atomic ratio of Te:As:Cu:W of about 1:3:12:12; and oxides of arsenic, copper and molybdenum with an atomic ratio of As:Cu:Mo of about 3:4:6. Total conversion of up to nearly 90% of isobutene with selectivity of about 90% methacrolein or more can be obtained.

The catalyst can readily be prepared by methods known to those skilled in the art. The catalyst can be prepared for instance, by intimately mixing the oxides of arsenic, copper and molybdenum or oxides of arsenic, copper, tellurium and one or both of molybdenum and tungsten or compounds giving these oxides on heating, for example, nitrates, hydroxides or basic nitrates. Alternatively, the catalyst can be prepared by precipitation, e.g., by adding an aqueous solution of copper nitrate to an aqueous solution or suspension of suitable salts of the other metals, neutralizing the mixture with ammonia and recovering the precipitate. The resulting cake is dried between 150 and 300° C. for four hours and then broken into granules or pelletized into tablets of desired size. The activity of the catalyst is improved by a prior heat treatment or calcination, for instance, at a temperature between about 550 and 1100° C. say for about two hours. If a supported catalyst is prepared, the catalytic metal oxides may be deposited on the support from an aqueous slurry of the metal oxides or oxides and nitrates, or the support may be impregnated with the metal salts in solution and then dried followed by heat treatment in a manner similar to that described in the preparation of unsupported catalyst.

The operating conditions which give favorable yields for the vapor phase oxidation of the olefin feedstock may vary widely. The oxidation is generally conducted with the catalyst in a fixed bed at atmospheric pressure, or elevated pressure if desired, and elevated temperatures. A suitable oxidation temperature, for example, is within the range of about 350 to 550° C., preferably about 450 to 525° C. The weight hourly space velocity is generally about 0.01 to 0.50 hr.$^{-1}$, preferably about 0.03 to 0.13 hr.$^{-1}$.

The volume hourly space velocity is generally about 100 to 3000 hr.$^{-1}$, preferably about 200 to 1500 hr.$^{-1}$. The maintenance of the space velocity within these ranges is advantageous in the production of the desired unsaturated aldehyde and the avoidance of the excessive production of by-products. The void volume is in the range of about 0.5 to 0.8 milliliter per one milliliter of catalyst bed.

In carrying out the oxidation, it is preferable to use a gas mixture containing about 2 to 12 mole percent olefin, about 10–30 mole percent oxygen, and about 50 to 85 mole percent nitrogen or other inert gas and to preheat the mixture to within a few degrees of the reaction temperature before introduction into the reaction zone, for example, to a temperature of about 450 to 525° C. A portion of the nitrogen can be replaced with steam so that, for instance, the gas mixture contains about 40 to 45 mole percent water. The addition of steam into the reactor along with the hydrocarbon and oxygen containing gas is desirable but not essential. The function of steam is not fully understood but the steam appears to reduce the amount of carbon oxides in the effluent gas. The water may assist, due to its polarity, in the desorption of the reaction product from the catalyst surface. According to one hypothesis, the water may change the nature of the catalyst at the catalyst surface by affecting the acidity of the catalyst.

The unsaturated aldehyde, e.g., methacrolein, can be isolated from the gas emerging from the catalyst bed by conventional means, e.g., by condensation, scrubbing with water, fractional distillation and combination of such techniques. Unreacted olefin remaining after extraction of the desired products can be recycled to the gas mixture fed into the catalyst. The methacrolein obtained can be used for conversion into methacrylic acid by further oxidation, and the methacrylic acid converted into esters which can be used for the manufacture of wide varieties of polymers and copolymers of substantial commercial value.

The apparatus used in the following examples is of the all-glass flow type consisting of a flow-metering section, evaporator, gas carburetor, reactor and product-collecting section. The gas input flow rates of prepurified nitrogen and oxygen were measured by three capillary flow meters, and the addition of the organic feed to the system was performed from a small stainless steel cylinder by using a flow-meter. The addition of water to the system was performed by saturation of the nitrogen flow with steam in the evaporator at a fixed temperature. The preheated gas flow ($O_2+H_2O$, $N_2+$olefin and secondary $N_2$) was mixed in a mixing bulb and then passed to a reactor which consisted of a preheating section and a reaction chamber, the reaction chamber being a coil 6 mm. in diameter. Three reactors with volumes of 15.7, 35.1, and 51.8 ml. were used in the examples. The reactor was immersed in a low melting salt bath medium with a controlled temperature of ±0.5° C.

The exit gases from the reactor were passed through a glass air condenser, two Dry-Ice traps, a water scrubber and were finally metered through a wet-test meter. Carbon dioxide determination of the effluent gas were carried out during the duration of the examples by a gas chromatographic method. The conversion is given in moles of product per 100 moles of isobutene fed, and the selectivity in moles of product per 100 moles of feed reacted. The volume hourly space velocity is expressed with respect to total gas at bath temperature and an empty reactor.

Various aspects of this invention are described by the following examples which illustrate preferred embodiments of the catalyst system of the invention, and the processes of oxidation of olefins therewith.

EXAMPLES 1–5

About 8 molar nitric acid was prepared by adding 50 ml. conc. $HNO_3$ to 50 ml. of water. While warming and stirring the nitric acid the following sequential additions were made: 0.75 g. $As_2O_3$, 0.35 g. $TeO_2$, 2.49 g. $MoO_3$ and 3.15 g. $Cu(NO_3)_2$ 3 $H_2O$. After about 20 minutes, a small portion of solid phase was present. The chemicals were poured onto 80 g. of warmed, 8–10 mesh (Tyler), porous silicon carbide and stirred while all the nitric acid was evaporated. With continued stirring, 50 ml. of concentrated ammonium hydroxide (sp. gr.=0.9), was slowly added. Heating and stirring were continued during reevaporation, and processing the remaining solid to 260° C. By this stage the sublimation of $NH_4NO_3$ seemed complete. The catalyst contained 5.3 wt. percent of active material on the silicon carbide support. The atomic ratio of Mo:Cu:As:Te was 25:8:4:1. The surface area of the catalyst was essentially zero m.²/gram. The void space in the catalyst bed was 0.681 ml./ml. This catalyst (46 grams) was packed in the 51.8 ml. reactor which was maintained at 485° C. and a gas mixture containing 10.3 mole percent isobutene, 29.9% oxygen and 59.8% nitrogen was introduced with a space velocity of 333 hr.$^{-1}$ A yield of 70.4 mole percent methacrolein (with respect to isobutene fed) and a selectivity of 79.5% were obtained. Table 1, Example 1.

TABLE 1

| Ex. | $O_2$/iso-$C_4H_8$ | $H_2O$/$C_4H_8$ | VHSV, hrs.$^{-1}$ | Methacrolein, mole percent Conversion | Methacrolein, mole percent Selectivity mole percent | Total conversion of iso-$C_4H_8$, mole percent |
|---|---|---|---|---|---|---|
| 1 | 2.9 | No steam | 333 | 70.4 | 79.5 | 88.7 |
| 2 | 3.1 | 5.0 | 333 | 64.4 | 74.6 | 86.3 |
| 3 | 1.0 | No steam | 333 | 49.8 | 84.1 | 59.0 |
| 4 | 1.0 | 3.4 | 493 | 36.5 | 78.4 | 58.7 |
| 5 | 1.0 | 3.7 | 1,090 | 36.3 | 76.2 | 47.6 |

The operation was repeated under substantially identical conditions but with the exception that steam was added (Example 2). In this way a conversion of isobutene to methacrolein of 64.4 mole percent was obtained. This represents a selectivity to methacrolein of 74.6% based on isobutene reacted. In Examples 3 and 4 the oxygen to isobutene ratio was decreased from the original ratio of 3:1 to 1:1 whereas the other conditions were comparable to those employed in experiments 1 and 2. The conversions to methacrolein (and also the total conversions) decreased from the original 70.4 and 64.4% to 49.8 and 36.5%, respectively, whereas the selectivities increased from 79.5 and 74.6% to 84.1 and 78.4%, respectively. The data also show that the presence of moisture is not essential to good yields of end-product desired.

Another test (Example 5) was made under identical conditions as described in run 4 but with the exception that the space velocity was increased 3.5 times. To obtain the desired velocity a 15.7 ml. reactor containing 13 gr. of the same catalyst was used. The data show that while the total conversion of isobutene decreased from 58.7 to 47.6 mole percent, the conversion and selectivity to methacrolein remained almost unchanged.

EXAMPLE 6

When the silicon carbide suport of Examples 1–5 was replaced with "Ludox LS" colloidal silica lower yields of and selectivities to methacrolein were obtained. $(NH_4)_6Mo_7O_{24}$x$4H_2O$ (4.5%) was first dissolved in 40 ml. of water. This was followed by the addition of 1.76 g. of $(NH_4)_2HAsO_4$, 11.0 ml. of conc. ammonia (28% $NH_3$, density 0.90), 4.62 g. of $Cu(NO_3)_2$x$3H_2O$ (complexed with minimum amount of conc. ammonia) and 0.78 g. $(NH_4)_2TeO_4$. The latter would not dissolve completely, even after adding 53 ml. conc. ammonia during 135 minutes. The filtrate was added to 330 ml. "Ludox LS" (30% silica, 1.2 density). A gelation occurred in the latter stages. By steps involving slow drying, sizing and heating to 280 C. in an air-atmosphere electric muffle, an 8-10 mesh (Tyler) catalyst was obtained. The catalyst contained 5.4 wt. percent of active material on Ludox support. The atomic ratio of Mo:Cu:As:Te was 25:20:8:1. The void space in the catalyst bed was 0.73 ml./ml.

This catalyst (24.9 gr.) was packed in the 51.8 ml. reactor which was maintained at 485° C. and a gas mixture containing 11.0 mole percent isobutene, 29.2% oxygen, 19.5% nitrogen and 40.4% steam was introduced with a space velocity of 333 hr.$^{-1}$. The analytical results of the produced gas are shown in Table 2.

TABLE 2

|  | Conversion, mole percent | Selectivity on the consumed isobutene basis, mole percent |
|---|---|---|
| Methacrolein | 11.7 | 20.2 |
| Methacrylic acid | 2.4 | 4.1 |
| Carbon oxides | 43.9 | 75.9 |

The total conversion of isobutene was 58%, and the recovery of products was 96%.

EXAMPLES 7 AND 8

To 50 ml. of conc. HNO$_3$ (about 16 molar) was added 0.52 g. arsenic pentoxide, 2.17 g. Cu(NO$_3$)$_2$x3H$_2$O, followed by 0.24 g. TeO$_2$ and 4.84 g. ammonium tungstate. The suspension which formed after one-half hour stirring was added to 74.4 g. of 8-10 mesh porous silicon carbide. The carbide was prewarmed prior to incremental additions. Incremental additions of conc. NH$_4$OH (0.9 density, 28% NH$_3$) were made until a total of 50 ml. was added. Heating was continued to about 500° C. The catalyst contained 6.7% by weight of active material on the support.

The atomic ratio of Te:As:Cu:W was 1:3:12:12 and the void space in the catalyst bed 0.69 ml./ml. This catalyst (40.9 gr.) was packed in the 51.8 ml. reactor. The flow rate of the mixed gas was 104 ml./mlin. (NTP) and the temperature of the catalyst bed 485° C. The effect of the addition of water was investigated. These results are tabulated in Table 3.

TABLE 3

| Example | 7 | 8 |
|---|---|---|
| Gas composition: | | |
| O$_2$/iso-C$_4$H$_8$ | 1.1 | 1.2 |
| H$_2$O/iso-C$_4$H$_8$ | | 4.4 |
| Conversion (mole %): | | |
| Methacrolein | 30.3 | 37.1 |
| Methacrylic acid | 0.9 | 2.3 |
| Carbon oxides | 16.4 | 13.8 |
| Total conversion | 47.7 | 53.2 |
| Selectivity on the consumed iso-C$_4$H$_8$ basis (percent): | | |
| Methacrolein | 63.5 | 69.6 |
| Methacrylic acid | 1.9 | 4.3 |
| Carbon oxides | 34.4 | 25.9 |

The recoveries were 99.0 and 98.8%, respectively.

EXAMPLES 9 AND 10

The same procedures of catalyst preparation as in Examples 1-5 were followed with the exception that the addition of tellurium dioxide was omitted. The resulting catalyst consisting of arsenic-, copper-molybdate on silicon carbide (As:Cu:Mo=3:4:6), contained 7.6% by weight of active material on the support. The void space in the catalyst bed was 0.69 ml./ml. 45.1 gr. of the catalyst was packed in the 51.8 ml. reactor. The flow rate of the mixed gas was 104 ml./min. (NTP) and the temperature of the catalyst bed was 485° C. The addition of water was investigated. These results are tabulated in Table 4.

TABLE 4

| Example | 9 | 10 |
|---|---|---|
| Gas composition: | | |
| O$_2$/iso-C$_4$H$_8$ | 2.8 | 2.9 |
| H$_2$O/iso-C$_4$H$_8$ | | 3.9 |
| Conversion (mole percent): | | |
| Methacrolein | 19.8 | 30.2 |
| Methacrylic acid | 0.4 | 2.8 |
| Carbon oxides | 21.1 | 17.0 |
| Total conversion | 41.2 | 49.9 |
| Selectivity on the consumed iso-C$_4$H$_8$ basis (percent): | | |
| Methacrolein | 48.1 | 60.4 |
| Methacrylic acid | 1.0 | 5.6 |
| Carbon oxides | 51.1 | 34.1 |

The recoveries were 98.4 and 100.6%, respectively.

It is claimed:
1. A process for the catalytic vapor phase oxidation of a member selected from the group consisting of propylene and isobutene to an unsaturated aldehyde which comprises oxidizing said member in the vapor phase at a temperature of about 350 to 550° C. with molecular oxygen-containing gas in contact with an oxidation catalyst consisting essentially of oxides of copper, arsenic, tellurium and molybdenum or tungsten supported on a silicon carbide carrier, said metals being present in the catalyst in the following atomic ratios:

$$Cu_aAs_bTe_cX_d$$

where X is molybdenum or tungsten, $a$ is about 2 to 30, $b$ is about 0.1 to 15, $c$ is about 0.2 to about 5, and $d$ is about 2 to 30.

2. The process of claim 1 wherein the oxidation catalyst consists essentially of oxides of copper, arsenic, tellurium and molybdenum, said metals being present in the catalyst in the following atomic ratios of $$Cu_aAs_bTe_cMo_d$$

where $a$ is about 5 to 20, $b$ is about 3 to 8, $c$ is about 0.5 to 2 and $d$ is about 5 to 25.

3. The process of claim 2 wherein the oxidation catalyst contains an atomic ratio of Mo:Cu:As:Te of about 25:8:4:1.

4. The process of claim 2 wherein the oxidation catalyst contains an atomic ratio of Mo:Cu:As:Te of about 25:20:8:1.

5. The process of claim 1 wherein the oxidation catalyst consists essentially of oxides of copper, arsenic, tellurium, and tungsten, said metals being present in the catalyst in the following atomic ratios of:

$$Cu_a:As_b:Te_c:W_d$$

where $a$ is about 4 to 30, $b$ is about 3 to 8, $c$ is about 0.5 to 2, and $d$ is about 5 to 25.

6. The process of claim 5 wherein the oxidation catalyst composition contains an atomic ratio of $$Te:As:Cu:W$$

of about 1:3:12:12.

7. The process of claim 1 wherein the olefin is isobutene and the unsaturated aldehyde is methacrolein.

8. The process of claim 1 wherein the oxidation reaction is conducted at temperatures of about 350 to 550° C. a volumetric hourly space velocity of about 200 to 1500 hr.$^{-1}$ and a weight hourly space velocity of about 0.03 to 0.13 hr.$^{-1}$.

9. The process of claim 1 wherein the oxidation reaction is carried out in the presence of a gas mixture comprising nitrogen and oxygen.

10. The process of claim 9 wherein the oxidation reaction is carried out in the presence of a gas mixture comprising oxygen, nitrogen and steam.

11. The process of claim 10 wherein the gas mixture contains about 2-12 mole percent olefin, about 10-30 mole percent oxygen, and about 50–85 mole percent nitrogen.

References Cited

UNITED STATES PATENTS

| | | | |
|---|---|---|---|
| 3,280,193 | 10/1966 | Whim | 260—604 |
| 3,444,240 | 5/1969 | Coyne et al. | 260—604 |

FOREIGN PATENTS

| | | | |
|---|---|---|---|
| 1,447,982 | 6/1966 | France | 260—604 |

OTHER REFERENCES

Voge et al,. Advances in Catalysis, vol. 17, 1967, pp. 199–203.

BERNARD HELFIN, Primary Examiner

R. H. LILES, Assistant Examiner

U.S. Cl. X.R.

260—533 N; 252—439